United States Patent [19]
Knauer et al.

[11] Patent Number: 5,144,435
[45] Date of Patent: * Sep. 1, 1992

[54] NOISE IMMUNITY IN N SIGNALS

[75] Inventors: Scott C. Knauer, Mountainside; Arun N. Netravali, Westfield, both of N.J.

[73] Assignee: AT&T Bell Laboratories, Murray Hill, N.J.

[*] Notice: The portion of the term of this patent subsequent to Aug. 27, 2008 has been disclaimed.

[21] Appl. No.: 532,526

[22] Filed: Jun. 1, 1990

[51] Int. Cl.$^5$ ............................................. H04N 5/213
[52] U.S. Cl. ..................................... 358/167; 358/36; 358/136; 358/141
[58] Field of Search ................... 358/167, 166, 36, 37, 358/340, 336, 343, 327, 310, 335, 135, 136

[56] References Cited

U.S. PATENT DOCUMENTS

| | | | |
|---|---|---|---|
| 4,684,983 | 8/1987 | Acampora | 358/136 |
| 4,703,350 | 10/1987 | Hinman | 358/133 |
| 4,837,611 | 6/1989 | Faroudja | 358/12 |
| 4,851,906 | 7/1989 | Koga | 358/133 |
| 4,918,515 | 4/1990 | Faroudja | 358/141 |
| 4,926,261 | 5/1990 | Matsumoto | 358/36 |
| 4,931,743 | 6/1990 | Fukuda | 358/36 |

Primary Examiner—James J. Groody
Assistant Examiner—Sherrie Hsia
Attorney, Agent, or Firm—Henry T. Brendzel

[57] ABSTRACT

An arrangement for a television receiver to attenuate correlated noise injected by the transmission medium. Recognizing that there is substantial line to line correlation of the transmission noise injected by interfering television stations, this arrangement enhances noise immunity by inserting in the receiver a de-emphasis stage that includes a circuit for removing the correlated noise. To account for the modifications to the desired signal that are introduced by the de-emphasis circuit, a pre-emphasis circuit is included in the transmitter. In accordance with one embodiment, the receiver's circuit comprises a feed-forward arrangement where the received signal of a scan line is subtracted from a fraction of the received signal of the previous scan line. At the transmitter, a feedback loop develop a scan line to be transmitted that corresponds to a video scan line subtracted from a fraction of the previous scan line to be transmitted. This arrangement also removes some of the correlation in the signal of the video scan lines, which results in the developed scan lines having lower amplitudes. The latter permits insertion of a gain stage, which increases the signal power relative to the noise and thereby improves the signal to noise ratio at the receiver.

6 Claims, 1 Drawing Sheet

NOISE IMMUNITY IN N SIGNALS

BACKGROUND OF THE INVENTION

This invention relates to television transmitters and receivers. More specifically, this invention relates to enhanced transmission and reception of HDTV signals.

The bandwidth of video signals from high definition TV cameras is substantially larger than the bandwidth of conventional (NTSC) signals. In order to fit HDTV transmission in the spectrum normally allocated to conventional TV channels and concurrently permit reception by conventional TV receivers, a substantial reduction in the bandwidth of HDTV signals is necessary, in addition to innovative allocation of the spectrum. In order to allow for terrestrial HDTV transmission concurrently with terrestrial NTSC transmission, one proposal is that conventional TV transmissions remain unaltered and that the HDTV transmissions occupy the spectrum that is currently devoted to separating the NTSC channels. These separation channels are normally referred to as the "taboo" channels.

Two noise interference concerns must be addressed, however. One is the interference of the HDTV signals in the NTSC broadcasts, and the other is the interference of the NTSC signals in the HDTV broadcasts. Before these are addressed however, it may be useful to first describe the proposed HDTV format.

In the proposed HDTV format, each frame consists of analog signals and digital signals. The timing is controlled so that the analog signals are transmitted during the frame signal portion of adjacent NTSC channels, and the digital signals are transmitted during the retrace portion of the frame signals of adjacent NTSC channels. This approach takes advantage of the fact that noise introduced by HDTV signals during a retrace interval is not displayed and is therefore harmless to the NTSC broadcasts. Consequently, a less stringent bandwidth limiting of the HDTV digital signal is permissible. The analog portion of the HDTV digital signal comprises a collection of concatenated PAM pulses that describe the energy in an error signal which is derived by comparing the frame's video signal to the immediately previous frame's video signal that is motion compensated.

Noise introduced by the NTSC channels has the greatest potential for disruption of the received image when it corrupts the digital signals of HDTV. However, since during the retrace interval the NTSC signals are quiescent, the problem is not severe; particularly since the digital signals can employ error detection and correction techniques. To minimize the effects of noise on the analog signal, the aforementioned application discloses a number of complementing solutions. One is combining PAM pulses, another is decomposing large signals into smaller ones or appending such large signals to the digital signal (coupled with gain control of the analog signal), still another is introducing signal leak, and lastly, employing scrambling.

The concept of combining PAM pulses improves noise immunity by converting a group of adjacent low amplitude pulses into a single PAM pulse of larger amplitude. Whereas low amplitude PAM pulses can be greatly affected by additive noise, the combined PAM pulses (when properly encoded) affects only one of the constituent PAM pulses.

The second concept, that of eliminating large amplitude PAM pulses and employing gain control, recognizes that when the signal to be transmitted is known to have an amplitude no greater than some given level, then that signal can be increased (by introducing gain) prior to transmission without exceeding the maximum allowable power. At the receiver, the signal is attenuated by a corresponding magnitude. Noise that is added by the transmission medium is thereby also attenuated.

The signal leak concept recognizes that some noise is inevitable, and inserts a fraction of the video frame into the error signal that is transmitted. By appropriate subtraction at the receiver, noise that is unavoidably injected is eventually flushed out of the receiver.

The scrambling concept also deals with the expectation that some noise unavoidably will be accepted by the receiver. The concern is with correlated noise that comes about through fading and multiple path receptions. The effects of such noise are minimized by scrambling the signal at the transmitter's end and unscrambling it at the receiver's end to produce snow-like noise at the receiver when burst errors occur, rather than correlated noise (such as "ghosts").

The above-described techniques deal with each frame signal essentially as an independent entity. No attempt is made to make use of whatever correlation exists between frames. More importantly, no attempt is made to take advantage of correlated components in the noise. Yet, some benefits (from the standpoint of noise immunity) may be derived from such considerations.

SUMMARY OF THE INVENTION

Recognizing that noise from adjacent NTSC channels contains a correlated component, and that some correlation exists between successive frames, it makes sense to utilize this correlation in an effort to enhance the attenuation of noise injected by the transmission medium. In particular, it should be recognized that while there is a positive correlation from frame to frame (though this correlation is attenuated by image motion), there is a marked correlation from line to line, even in the presence of motion. This is true for the HDTV signal and even more so for the interfering NTSC signal.

In accordance with the principles of this invention, noise immunity is enhanced by inserting in the receiver a de-emphasis stage that includes a circuit for removing the correlated noise. The transmitter includes a circuit for modifying the transmitted signal so that the receiver's circuit for removing the correlated noise recovers the signal that was to be communicated. In accordance with one embodiment, the receiver's circuit comprises a feed-forward arrangement where the received signal of a scan line is diminished by a fraction of the received signal of the previous scan line. At the transmitter, a feedback loop develops a scan line to be transmitted that comprises a negative of a video scan line that is increased by a fraction of the previous scan line to be transmitted. This arrangement also removes some of the correlation in the signal of the video scan lines, which results in the developed scan lines (to be transmitted) having lower amplitudes. The latter permits insertion of a gain stage, which increases the signal power relative to the noise and thereby improves the signal to noise ratio at the receiver. More specifically, the output signal of a line, $X_n$ (where n is the line number), is converted to a transmitted line $Z_n$ by the relationship $Z_n = (-1)^n X_n + \alpha Z_{n-1}$, where $\alpha$ is a preselected fraction less than 1. This output signal is increased through a gain stage and transmitted over the noisy channel. The received signal (if attenuated by a corresponding amount) is modified with a feed-forward arrangement to develop the signal $+\hat{Z}_n-\alpha \hat{Z}_{n-1}$, where $\hat{Z}_n$ is the received signal $GZ_n+f_n$, $f_n$ is the noise signal and G is the gain introduced at the transmitter. When $\alpha$ is less than 1, the feed-forward arrangement results in the signal $GZ_n+f_n$.

DETAILED DESCRIPTION

Figure 1:
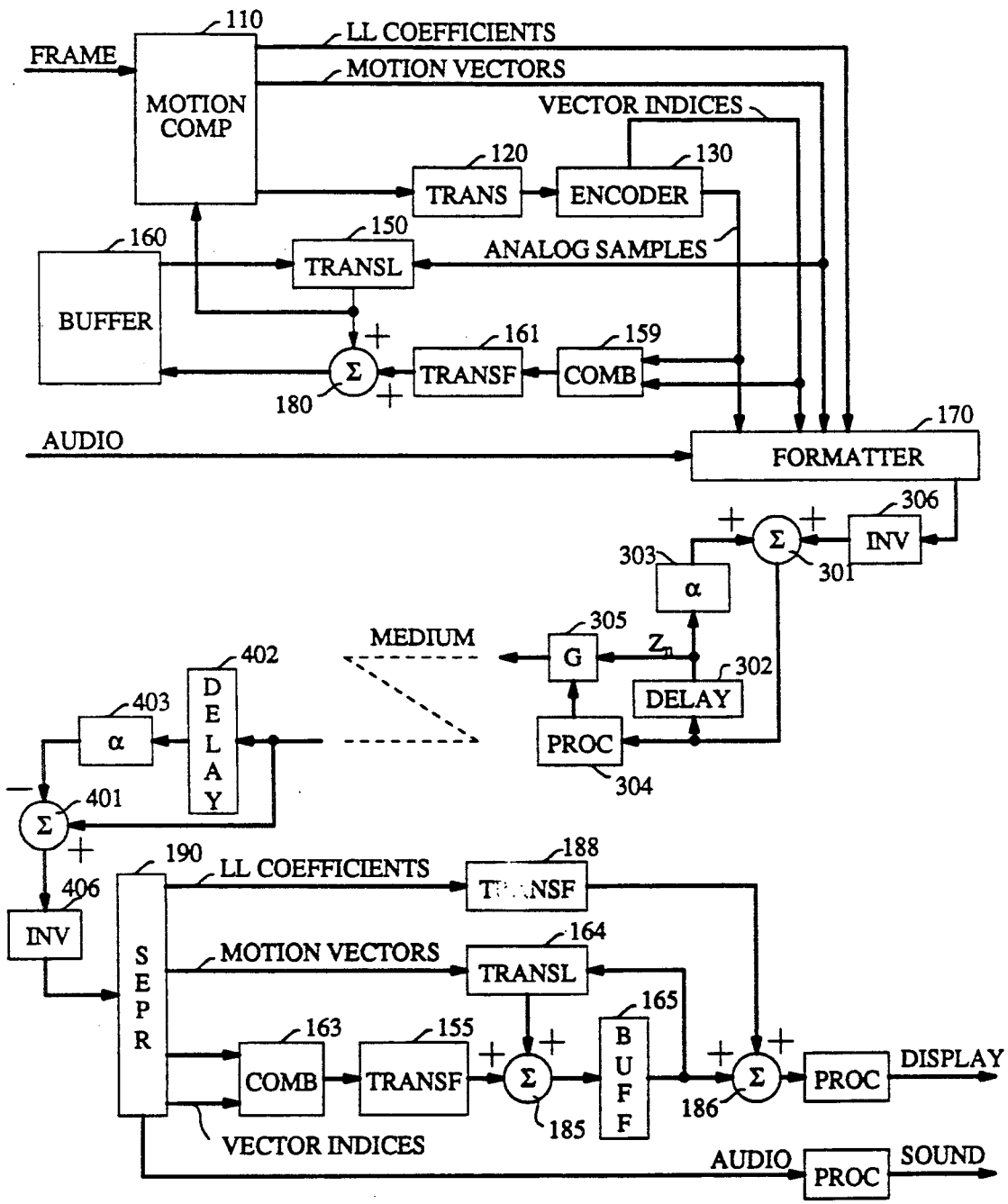
FIG. 1 depicts a block diagram of an HDTV transmitter with a pre-emphasis arrangement and a receiver's de-emphasis arrangement.

FIG. 1 presents a block diagram that includes an encoding section that corresponds to the transmitter and a decoding section that corresponds to the receiver. Both are disclosed in detail in the aforementioned application and, therefore, they are described herein only in cursory manner. The specific encoding and decoding approaches that are employed are not important to the principles of this invention.

The encoder maintains an image of the previous frame in buffer 160. When a new frame appears, it is compared to the old frame in motion compensation block 110. This comparison develops: a) motion vectors that describe the movements (motion compensation) imparted to the old frame that produce the best estimate of the new frame, b) n coefficients which describe the two-dimensional low frequency coefficients in the error signal developed by subtracting the best estimate of the new frame from the true new frame, and c) the error signal with the two-dimensional low frequency components deleted. The motion vectors and the n coefficients are sent to formatter 170 where they are encoded into the retrace interval, and the error signal with the n components deleted is applied to transformer 120. This signal is transformed and encoded in block 130 to result in PAM analog samples that represent the error signal. Those PAM signals are converted back to an error signal via blocks 159 and 161, are motion compensated in translator 150 and added to buffer 160. The PAM signals are also applied to formatter 170 where they are encoded into the active interval of the frame.

At the receiver, the motion vectors, the n coefficients and the PAM signals are extracted from the received signals by separator 190. The PAM signals are converted back to an error signal via blocks 163 and 155, the motion vectors are folded in by blocks 164 and 185 and a frame buffer signal is developed. The n coefficients are transformed and added to the signal of buffer 165 to form the video frame.

Between formatter 170 and separator 190 lies the transmission medium. This medium introduces a noise $f_n$ which can be thought to comprise a random noise signal and a correlated noise signal. The correlated noise is the collection of "ghosts" from NTSC TV channels. Thus, $f_n$ may be thought to comprise $r_n$ (the random noise)+$g_n$ (the correlated noise).

In accordance with the principles of this invention, the PAM signal that is developed by formatter 170 (the modulation onto a carrier is ignored herein for sake of simplicity) is applied to a pre-emphasis circuit prior to transmission. This circuit comprises elements 301, 302, 303, 304, 305 and 306. More specifically, the output signal of formatter 170 that is operated on by the pre-emphasis circuit is the PAM signal that occupies the active portion of the frame scan. That portion is considered to be made up of a plurality of "line scans" $X_n$, where n is the line number. (The signal in those "line scans" need not correspond strictly to a line of video. That depends on the encoding approach used in blocks 120 and 130 of the transmitter. Whatever correspondence exists, however, any remaining residual positive correlation between successive "line scan" is beneficial.) The line scans are applied to circuit 306 which is an alternating inverter. Every other line is negated. (This circuit can be made up of a subtractor and a switch). The output of circuit 306 is applied to adder 301 and the output of adder 301 is applied to delay circuit 302 and to power calculation processor 304. The delay in circuit 302 is the delay of one line scan and, therefore, the output of delay 302 is the line scan that was previously inserted. That output is sent to circuit 303 which multiplies the signal by $\alpha$ and applies the result to adder 301.

Processor 304 develops a measure of the peak power in the output signal of element 301, and based on that measure it develops a gain control signal that is applied to gain stage 305. Gain stage 305 is responsive to the output of delay circuit 302. In this manner, the signal that is developed by adder 301, which is smaller in magnitude than the signal at the adder's input connected to element 306, to the extent that there is a positive correlation between successive line scans, is amplified up to the maximum allowable power level and then cast onto the transmission medium. The delay afforded by using the output of delay element 302 (rather than the output of adder 301 directly) allows time to develop the gain control signal. The value of G is also sent to the receiver.

Stated mathematically, the signal $Z_n$ applied to gain block 305 is $(-1)^n X_n + \alpha Z_{n-1}$, which can be expressed in terms of the input alone by $$Z_n = \lim_{M \to \infty} \left( \sum_{i=0}^{M} \alpha^i (-1)^{n-i} X_{n-i} \right).$$

At the input of the receiver, a de-emphasis circuit is included in accordance with this invention. It includes elements 401, 402, 403, and 406. Specifically, the input from the transmission medium is applied to delay block 402 and to the positive input of subtractor 401. Like block 302, block 402 provides a one line scan delay. The delayed signal is multiplied by $\alpha$ in block 403 and subtracted from the received signal. The output of subtractor 401 is applied to alternating inverter circuit 406 (similar to 306) and that forms the input signal to separator 190.

For an input signal $Z_n+f_n$, the input to separator 190 is $G(Z_n - \alpha Z_{n-1}) + (f_n - \alpha f_{n-1})$ (note the G factor improvement in the signal to noise ratio). Considering the noise component only, the input to separator 190 is $(r_n - \alpha r_{n-1})$ plus $(g_n - \alpha g_{n-1})$: Since $r_n$ and $r_{n-1}$ are random, it is possible that they combine additively. Hence, the de-emphasis circuit reduces the random noise entering separator 190 only by $(1-\alpha)/G$ (vis-a-vis the signal). As for the correlated noise, the story is different. When the signal is highly correlated, then $g_n \approx g_{n-1}$, or $g_n = g_{n-1} + \delta$, where $\delta$ is very small. Under such conditions, the correlated noise entering separator 190, when $\alpha$ is close to 1, approaches $\delta/G$ (again, vis-a-vis the signal). That is a substantial reduction.

The level of G is dependent on the level of the signals developed by adder 301. That is, when the signal is highly correlated and $\alpha$ is set close to 1, then the output of element 301 is small. This allows the level of G to be high and still deliver a signal to the transmission medium that is within the allowed maximum power. When the correlation is not high, the output signal of element 301 is not as low, and the level of G must be reduced correspondingly.

It is unlikely that there would be no correlation at all from line to line. It is even more unlikely that the correlation would actually be negative. In such an unlikely event, the emphasis circuit within the transmitter would develop an output signal at adder 301 that is *larger* than the signal at the positive input of the subtractor. The value of G that would then be developed by processor 304 may even be less than 1. In the very unlikely event where G is less than 1 (i.e. negative correlation), the line scans signal can be scrambled prior to its input to adder 301. The algorithm may be fixed, so that the receiver need only be informed that until further notice the line scans signals are scrambled.

There are many scrambling approaches that may be taken. By way of an illustrative example, one scrambling approach may be to include a pair of line buffers between formatter 170 and the input of the adder. The line buffers are connected to formatter 170 through a toggle switch and to the adder through a toggle switch. One is arranged to work as a FIFO while the other is arranged to work as a LIFO. Under normal operation, the toggle switches are quiescent and positioned to permanently include the FIFO buffer in the signal path. When scrambling of every other line is desired, the toggle switches are caused to toggle with each line scan, thereby causing both buffers to be employed. The FIFO buffer would then deliver to adder 301 "straight" line scans, while the LIFO buffer would deliver to adder 301 "scrambled" (position reversed) line scans.

Another example of the scrambling technique would be to order the analog coefficient values so that the larger values are at the beginning of the line period in even numbered line periods, and at the end of the line in the odd numbered line periods. Thus, any subtraction from line to line will involve only one sample that has a high value, with the other sample typically being only a few percent of the amplitude of the larger one. Thus, while there would be little decrease in the amplitude of the coefficients coming out of the subtractor, there would also be little probability of increase (due to negative correlation). Actually, as the motion compensating system reduces the amplitude of the coefficients by large factors (before this scrambler is entered), there is little correlation to be exploited in the preemphasis circuit by the subtraction process anyway.

The encoding in accordance with the scrambling approach described above can be easily accomplished. Each PAM sample in a line scan has an associated vector. Recalling that the PAM sample is transmitted during the line scans interval and the vector information is transmitted during the retrace interval, it is noted that the vector information does not have to be scrambled. Observing that the PAM samples associated with certain vectors (say, V1 vectors) typically have large amplitudes, while the PAM samples of other vectors (V0 vectors) do not, it becomes easy to do the scrambling: those PAM samples that are associated with the V1 vectors are slotted from the beginning of a scan, towards the middle, and those PAM samples that are associated with V0 vectors are slotted from the end of the scan, also towards the middle. Such scrambling can be accomplished with a RAM, and conventional addressing techniques. This scrambling can be incorporated in INV 306 circuit.

Decoding at the receiver is straight forward because the vector information indicates whether the sample is large or small; and that indication assists in determining the de-scrambling process. As with the encoding process, the decoding can be accomplished with a RAM, and conventional addressing techniques. The de-scrambling can be incorporated in INV 406 circuit.

As an aside, the above description of the emphasis and de-emphasis circuits describe the use of a one line delay. Actually, the delay can be any number of lines, or fractions thereof. Most advantageously, the selection of delay would depend on the characteristics of the interfering noise.

We claim:

1. A TV receiver including means, responsive to input signals for receiving a plurality of line scan signals during a line scan interval of a TV frame and for receiving vector signals during a retrace interval of said TV frame, frame buffer means for storing a current set of signals representing at least a portion of a video frame, translator means for combining said current set of signals stored in said buffer means with said vector signals, means for augmenting output signals of said translator means in response to said line scan signals, and means for storing output signals of said means for augmenting in said frame buffer means, characterized in:

a de-emphasis circuit interposed between said input signals and said means for receiving, including
 delay means responsive to said line scan signals within said input signals for storing signals of a preselected number of line scan signals;
 attenuation means responsive to said line scan signals within said input signals for attenuating the signal of said plurality of line scan signals by a selected factor; and
 means for combining input signals of said delay means and output signals of said attenuation means to develop output signals of said de-emphasis circuit.

2. The receiver of claim 1 wherein said number of line scan signals is one.

3. The receiver of claim 1 wherein said number of line scan signals is greater than one.

4. The receiver of claim 1 wherein said number of line scan signals is a non-integer.

5. The receiver of claim 1, wherein said de-emphasis circuit includes signal de-scrambling means responsive to said means for combining.

6. The receiver of claim 5 wherein said de-scrambling means multiplies alternate sets of said preselected number of scan lines by $-1$.

* * * * *